R. K. GIFFEN.
LOADING MACHINE.
APPLICATION FILED APR. 30, 1920.

1,426,855.

Patented Aug. 22, 1922.
3 SHEETS—SHEET 1.

R. K. GIFFEN.
LOADING MACHINE.
APPLICATION FILED APR. 30, 1920.

1,426,855.

Patented Aug. 22, 1922.
3 SHEETS—SHEET 3.

INVENTOR.
R. K. Giffen.
By N. E. Dunlap,
ATTORNEY.

UNITED STATES PATENT OFFICE.

ROBERT K. GIFFEN, OF WHEELING, WEST VIRGINIA.

LOADING MACHINE.

1,426,855.    Specification of Letters Patent.    Patented Aug. 22, 1922.

Application filed April 30, 1920. Serial No. 377,777.

*To all whom it may concern:*

Be it known that I, ROBERT K. GIFFEN, a citizen of the United States of America, and resident of Wheeling, county of Ohio, and State of West Virginia, have invented certain new and useful Improvements in Loading Machines, of which the following is a specification.

This invention relates broadly to loading machines, and more particularly to a scoop and conveyor mechanism.

The chief object of the invention is to provide a machine or apparatus designed primarily for use in mines for the loading of coal upon cars and embodying a scoop and conveyor by which the coal may be taken up and automatically conveyed to a point whence it is delivered to a car.

A further object is to provide an apparatus of the character mentioned which is self-contained and self-propelled, which does not require the use of trackways, and which may be readily moved from place to place and conveniently shifted to any desired position for facilitating the loading operation.

A still further object is to provide a relative arrangement of scoop and traveling conveyor in which the material to be loaded is taken up and conveyed rearward to a delivery point without the employment of mechanism or means for lifting or elevating the scoop from its operative position.

Another object is to provide a conveyor mechanism comprising telescoping sections by which provision is made for increasing and decreasing its length to correspond with the distance between the material to be loaded and the delivery point.

Additional objects within the contemplation of the invention are to provide an apparatus of the character mentioned which is relatively simple in construction and inexpensive to build, which may be operated by persons possessing no high degree of ability or mechanical skill, and which is adapted for use in mines affording relatively small head room.

With these and other objects in view, the invention resides in the features of construction, arrangement of parts and combinations of elements which will hereinafter be fully described, reference being had to the accompanying drawings, in which—

Referring to said drawings, in which like designating characters distinguish like parts throughout the several views—

Figure 1:
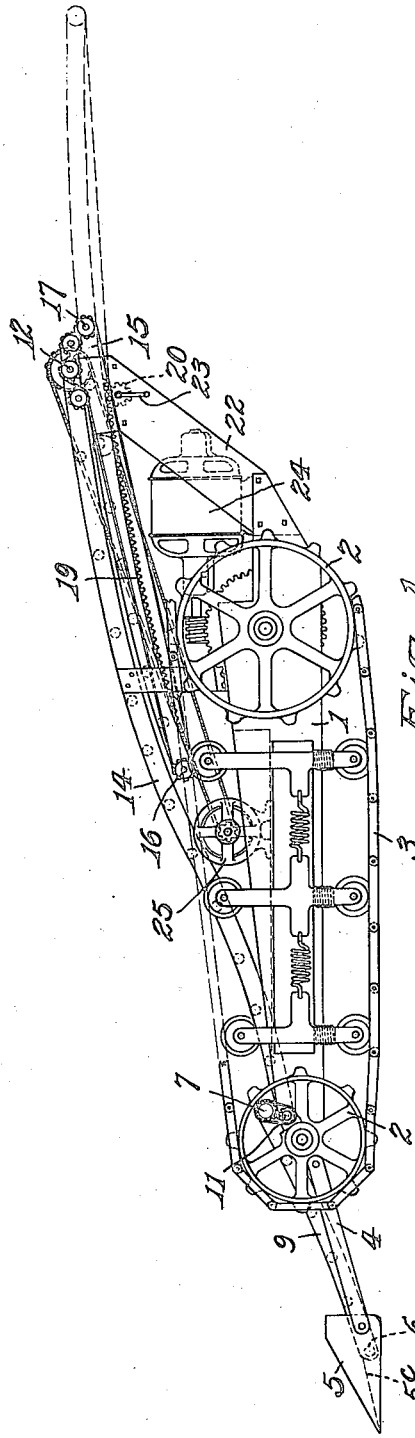
Figure 1 is a side elevation of the invention.
Figure 2:
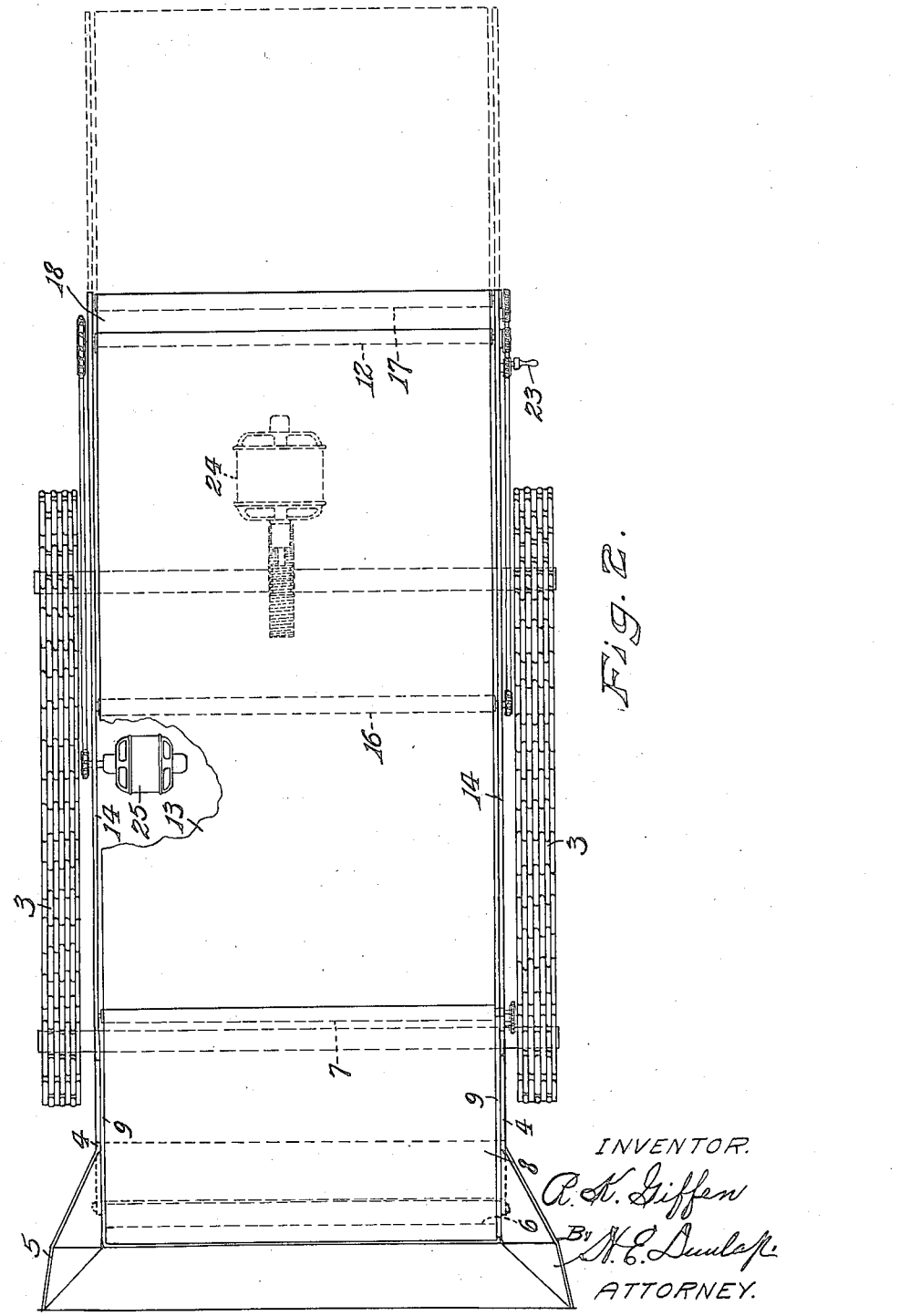
Figure 2 is a top plan view of the same.
Figure 3:
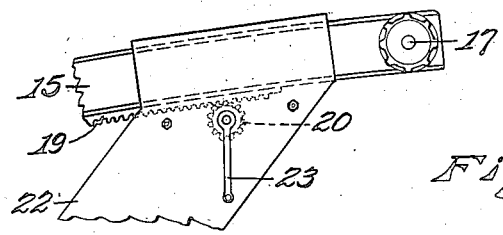
Figure 3 is an enlarged detail view of a portion of the movable section of the conveyor, illustrating the support and the shifting means therefor.
Figure 4:
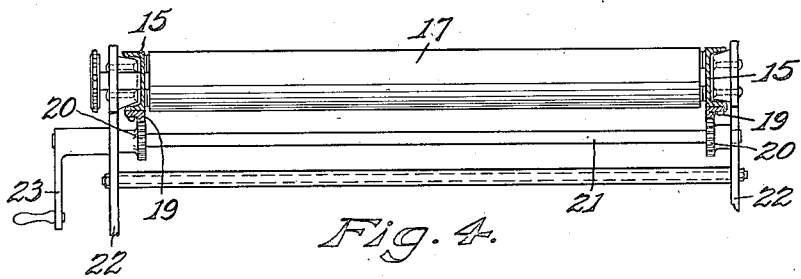
Figure 4 is a section on line 4—4, Fig. 3; and—
Figure 5:
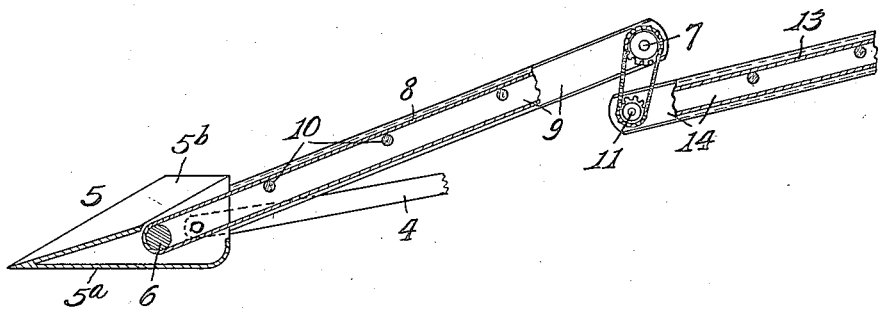
Figure 5 is an enlarged longitudinal section of the scoop and conveyor, said section being taken on line 5—5, Fig. 2.

1 indicates generally the frame, 2 the carrying wheels, and 3 the endless traveling treads of a tractor of the caterpillar type. Pivoted upon the front end of each of the sides of the frame is an end of an arm or link 4 which has pivotally attached to its opposite, or front, end a scoop 5 having a flat bottom $5^a$. Due to the pivotal connection of said scoop through the links with the frame, said scoop at all times is held by gravity upon the working floor or surface in position to be advanced and retracted with its bottom sliding upon said floor or surface, as the tractor moves forward and rearward with respect to the material which is to be handled.

Carried interiorly of the scoop 5 and having its ends suitably journaled, as in the sides $5^b$ of the scoop, adjacent to the bottom of the latter is a roller 6 which cooperates with a similar roller 7, journaled at a suitable point upon or over the front end of the frame 1, for carrying an endless traveling conveyor belt or apron 8 which operates between parallel side members 9 that carry suitably disposed supporting rollers 10. Said roller 6 underlies the rear end of an upwardly and rearwardly inclined false bottom $5^c$ formed on or carried by said scoop, so that, as the scoop is advanced into or under the material acted upon, such material will slide from the rear end of said inclined bottom and be deposited upon said conveyor belt 8.

The rear end of the conveyor section constituted by the rollers 6 and 7 and the belt or apron 8 overhangs the foremost end of a second conveyor section which inclines thence upward and rearward over the tractor frame and which preferably extends to or beyond the rear end of said frame. Said second conveyor section comprises end rollers 11 and 12 and a traveling belt or apron 13. Said rollers 11 and 12 are journaled in the opposite ends of suitable side members, as the channel bars 14, which are suitably mounted on the tractor frame 1. A third conveyor section is also preferably employed, the same being arranged for telescopic movement with respect to the second section and being adapted for adjustment to provide for delivery of the material handled at varying distances from the scoop end of the machine. Said third conveyor section comprises side members 15 having rollers 16 and 17 journaled, respectively, in the front and rear ends thereof and carrying a belt or apron 18. While said third conveyor may be mounted in any of various ways for telescopic movement, it is herein shown as embodying rack-bars 19 attached to the under sides of the side members 15 and as having said bars operatively mounted upon gears 20 carried by a shaft 21 mounted upon supporting brackets 22 carried by the frame 1. A hand crank 23 carried upon an end of said shaft 21 affords means whereby said shaft may be manually rotated for extending or retracting the telescopically movable section.

A motor 24 has its shaft suitably geared for driving the tractor. Any suitable means, as a second motor 25, may be provided for driving the belts or aprons of the conveyor sections, the rollers of said sections being driven through suitably arranged sprocket wheels and chains. The arrangement of the driving means for the belt or apron of the telescopically movable conveyor section is such that said belt is positively driven in any position within its range of movement, as shown.

From the foregoing it will be understood that the described apparatus or machine requires only to be shifted back and forth with respect to the body or mass of material to be loaded for entering and retracting the scoop to and from positions in which material is deposited upon the foremost conveyor belt whence it is transported to a delivery position, as to a car located beneath the delivery end of the conveyor. Furthermore, it will be apparent that, due to the tractor form of the truck which adapts the machine for rapid shifting movements and for approaching the mass of material from any desired angle, and also due to the fact that elevation or other movement of the scoop for dumping is not required, the machine is particularly efficient for the rapid handling of the material acted upon.

What is claimed is—

1. A loading machine comprising a truck, said truck having a frame, a scoop, links pivotally connected with said scoop and with the front end of the frame whereby a gravity-seated position of the scoop is maintained during operation, said scoop being actuated alone by the travel of the truck, and an endless travelling conveyor superposed upon said truck and having its front end disposed in underlying relation to the rear portion of the carrying surface of said scoop.

2. A loading machine comprising a truck, said truck having a frame, a scoop, links pivotally connected with said scoop and with the front end of the frame whereby the scoop is enabled to have a horizontal gravity-seated position on the working surface during operation, said scoop being actuated only by the travel of the truck, and an endless travelling conveyor superposed on said truck and having its front end disposed in underlying relation to the rear portion of the scoop, said conveyor being arranged in sections of which the rearmost is arranged for telescoping adjustment with respect to the section immediately forward.

3. A loading machine comprising a truck, said truck having a frame, a scoop, links pivotally connected to the front of said frame and to said scoop, an endless travelling conveyor superposed upon said truck and having its front end disposed in underlying relation to the rear portion of the carrying surface of the scoop, said conveyor being arranged in sections, and means for adjusting the rearmost of said sections longitudinally of the section immediately in front thereof, said means comprising a shaft journalled in the frame of the truck, rack bars attached to the adjustable conveyor section, gears on said shaft in mesh with the rack bars and a crank for rotating the shaft.

In testimony whereof, I affix my signature in presence of two subscribing witnesses.

ROBERT K. GIFFEN.

Witnesses:
 Thos. J. Rudge,
 H. E. Dunlap.